United States Patent
Zhou

(10) Patent No.: US 10,073,815 B2
(45) Date of Patent: *Sep. 11, 2018

(54) SYSTEM AND METHOD FOR SPEEDING UP GENERAL MATRIX-MATRIX MULTIPLICATION ON THE GPU

(71) Applicant: Palo Alto Research Center Incorporated, Palo Alto, CA (US)

(72) Inventor: Rong Zhou, San Jose, CA (US)

(73) Assignee: PALO ALTO RESEARCH CENER INCORPORATED, Palo Alto, CA (US)

( * ) Notice: Subject to any disclaimer, the term of this patent is extended or adjusted under 35 U.S.C. 154(b) by 25 days.

This patent is subject to a terminal disclaimer.

(21) Appl. No.: 15/169,422

(22) Filed: May 31, 2016

(65) Prior Publication Data

US 2017/0344514 A1 Nov. 30, 2017

(51) Int. Cl.
G06F 17/16 (2006.01)

(52) U.S. Cl.
CPC .................. G06F 17/16 (2013.01)

(58) Field of Classification Search
None
See application file for complete search history.

(56) References Cited

U.S. PATENT DOCUMENTS

| | | | |
|---|---|---|---|
| 2015/0324441 A1* | 11/2015 | Zhou | G06F 17/30598 707/737 |
| 2015/0324707 A1* | 11/2015 | Zhou | G06F 11/3409 717/124 |
| 2016/0179750 A1* | 6/2016 | Zhou | G06F 17/16 708/203 |
| 2016/0299874 A1* | 10/2016 | Liao | G06F 17/16 |
| 2017/0032487 A1* | 2/2017 | Ashari | G06T 1/20 |
| 2017/0168990 A1* | 6/2017 | Kernert | G06F 17/16 |
| 2017/0371839 A1* | 12/2017 | Zhou | G06F 17/16 |
| 2017/0372447 A1* | 12/2017 | Zhou | G06T 1/60 |
| 2018/0004709 A1* | 1/2018 | Zhou | G06F 8/443 |

* cited by examiner

*Primary Examiner* — David H Malzahn
(74) *Attorney, Agent, or Firm* — Shun Yao; Park, Vaughan, Fleming & Dowler LLP

(57) ABSTRACT

A method and system for performing general matrix-matrix multiplication (GEMM) operations on a graphics processor unit (GPU) using Smart kernels. During operation, the system may generate a set of kernels that includes at least one of a variable-dimension variable-K GEMM kernel, a variable-dimension constant-K GEMM kernel, or a combination thereof. A constant-K GEMM kernel performs computations for matrices with a specific value of K (e.g., the number of columns in a first matrix and the number of rows in a second matrix). Variable-dimension GEMM kernels allow for flexibility in the number of rows and columns used by a thread block to perform matrix multiplication for a sub-matrix. The system may generate rules to select the best (e.g., fastest) kernel for performing computations according to the particular parameter combination of the matrices being multiplied.

20 Claims, 15 Drawing Sheets

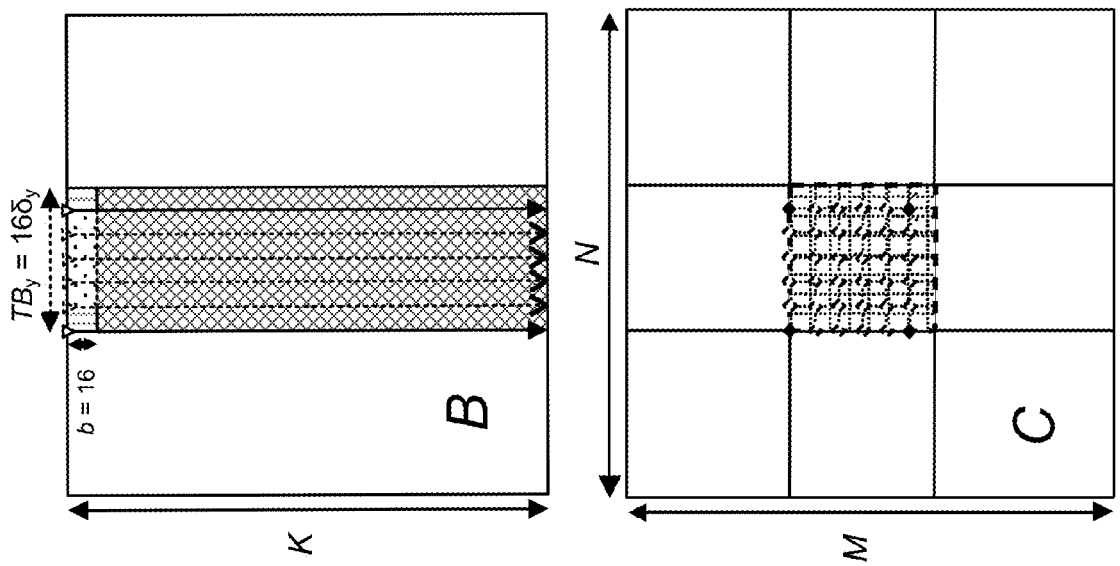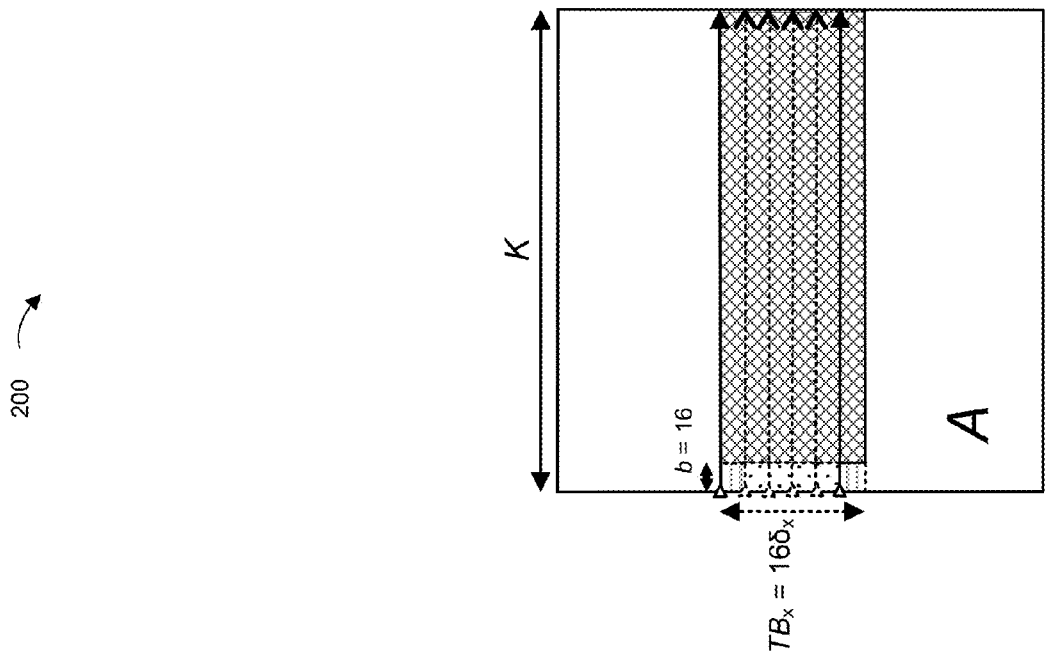
FIG. 2

300

```
α ← α_test, β ← β_test         /* init α, β to be used in C = αAB+ βC GEMM tests*/
Rules ← ∅                      /*Rules: a set of rules for picking the best GEMM kernel */
foreach ⟨M, N, K⟩ in MNK_test   /* loop over MNK_test, the set of ⟨M, N, K⟩ test triples */
    A.init(M, K), B.init(K, N), C.init(M, N)  /* init matrices A, B, C based on M, N, K */
    FLOPS_max ← 0              /* FLOPS: floating point operations per second */
    f* ← nil                   /* f*: best kernel for the current test triple */
    foreach f in F_GEMM        /* loop over F, the set of GEMM kernel functions */
        if f.varK() = true or f.constK(K) = true then  /* make sure kernel f can handle K */
            δ_x ← f.δ_x        /* f.δ_x: row-stops of kernel f */
            δ_y ← f.δ_y        /* f.δ_y: column-stops of kernel f */
            TB_x ← 16 × δ_x    /* TB_x:# of rows of A per thread block*/
            TB_y ← 16 × δ_y    /* TB_y: # of columns of B per thread block */
            grid.x ← ⌈M / TB_x⌉    /* grid.x: # of thread blocks in 1st dim of grid */
            if grid.x ≤ MAX_GRID_DIM_X then  /*1st dim of grid big enough? */
                grid.y ← 1     /* no need to use 2nd dim of grid */
            else
                grid.y ← ⌈grid.x / MAX_GRID_DIM_X⌉  /* use 2nd dim of grid */
                grid.x ← MAX_GRID_DIM_X  /* assuming two dims are big enough for ⌈M / TB_x⌉ */
            end if
            grid.z ← ⌈N /TB_y⌉  /* assuming 3rd dim of grid is big enough for ⌈N / TB_y⌉ */
            block.x ← 16       /* block.x: # of threads per row of a thread block */
            block.y ← 16       /* block.y: # of threads per column of a thread block */
            FLOPS ← f⟨⟨⟨grid, block⟩⟩⟩(C, A, B, M, N, K, α, β)  /* launch GEMM kernel, get its
                                                                    speed */
            if FLOPS > FLOPS_max then    /* better than the best kernel found so far? */
                FLOPS_max ← FLOPS        /* update FLOPS_max, the incumbent speed record */
                f* ← f         /* mark f as the best kernel so far for current test triple */
            end if
        end if
    end for
    Rules.add("M, N, K → f*")  /* add a rule that uses f* to process ⟨M, N, K⟩ triple */
end for
Rules.output()                 /* output the rules in terms of ⟨M, N, K, f*⟩ quadruples */
```

FIG. 3

TABLE 1

| K | Fixed-dimension (MAGMA) | | | | | | Variable-dimension constant-K | | | | | | Variable-dimension variable-K | | | | | |
|---|---|---|---|---|---|---|---|---|---|---|---|---|---|---|---|---|---|---|
|   | 16 | 32 | 48 | 64 | 80 | 96 | 16 | 32 | 48 | 64 | 80 | 96 | 16 | 32 | 48 | 64 | 80 | 96 |
| 2 | 14 | 24 | 32 | 38 | 40 | 46 | 77 | 81 | 79 | 80 | 74 | 76 | 62 | 72 | 75 | 71 | 67 | 57 |
| 3 | 21 | 36 | 47 | 57 | 60 | 68 | 112 | 117 | 114 | 119 | 105 | 86 | 90 | 106 | 111 | 105 | 99 | 84 |
| 4 | 27 | 48 | 63 | 76 | 80 | 91 | 145 | 158 | 151 | 157 | 131 | 113 | 115 | 139 | 145 | 138 | 129 | 110 |
| 5 | 34 | 61 | 78 | 95 | 100 | 113 | 174 | 186 | 186 | 187 | 159 | 139 | 140 | 169 | 177 | 168 | 158 | 136 |
| 6 | 41 | 73 | 94 | 113 | 120 | 136 | 205 | 217 | 212 | 220 | 188 | 161 | 161 | 197 | 208 | 199 | 187 | 160 |
| 7 | 46 | 84 | 110 | 132 | 140 | 158 | 232 | 249 | 240 | 252 | 211 | 185 | 183 | 226 | 238 | 228 | 215 | 185 |
| 8 | 56 | 96 | 125 | 150 | 160 | 181 | 259 | 290 | 267 | 287 | 237 | 215 | 200 | 250 | 264 | 256 | 240 | 208 |
| 9 | 62 | 109 | 141 | 170 | 180 | 204 | 275 | 307 | 290 | 300 | 260 | 230 | 220 | 273 | 290 | 281 | 267 | 231 |
| 10 | 69 | 121 | 156 | 188 | 199 | 225 | 290 | 329 | 317 | 326 | 276 | 253 | 235 | 295 | 317 | 309 | 292 | 252 |
| 11 | 76 | 133 | 171 | 206 | 219 | 247 | 307 | 353 | 339 | 352 | 295 | 261 | 253 | 318 | 341 | 335 | 318 | 274 |
| 12 | 82 | 145 | 187 | 225 | 237 | 269 | 313 | 367 | 369 | 376 | 317 | 281 | 266 | 335 | 362 | 358 | 340 | 295 |
| 13 | 89 | 156 | 201 | 243 | 258 | 291 | 347 | 383 | 395 | 400 | 341 | 281 | 280 | 352 | 380 | 360 | 358 | 315 |
| 14 | 96 | 168 | 217 | 260 | 278 | 314 | 330 | 387 | 407 | 419 | 359 | 294 | 290 | 366 | 394 | 397 | 378 | 334 |
| 15 | 102 | 179 | 232 | 278 | 298 | 336 | 359 | 416 | 431 | 443 | 372 | 316 | 302 | 381 | 410 | 419 | 397 | 352 |
| 16 | 109 | 191 | 249 | 297 | 318 | 359 | 337 | 437 | 438 | 457 | 402 | 338 | 353 | 436 | 465 | 449 | 434 | 368 |
| 17 | 68 | 133 | 195 | 235 | 252 | 287 | 347 | 457 | 450 | 465 | 408 | 369 | 305 | 398 | 438 | 436 | 423 | 368 |
| 18 | 72 | 141 | 197 | 249 | 266 | 302 | 336 | 450 | 457 | 468 | 424 | 369 | 313 | 406 | 449 | 450 | 441 | 383 |
| 19 | 76 | 149 | 208 | 253 | 280 | 320 | 363 | 473 | 476 | 492 | 437 | 381 | 325 | 418 | 463 | 466 | 457 | 400 |
| 20 | 80 | 157 | 219 | 277 | 295 | 335 | 345 | 458 | 478 | 494 | 451 | 394 | 329 | 426 | 471 | 478 | 469 | 412 |
| 21 | 84 | 164 | 229 | 290 | 309 | 351 | 363 | 481 | 496 | 507 | 450 | 404 | 340 | 436 | 487 | 493 | 483 | 427 |

FIG. 5A

TABLE 1 (CONTINUED)

| | | | | | | | | | | | | | | | | | | | | |
|---|---|---|---|---|---|---|---|---|---|---|---|---|---|---|---|---|---|---|---|---|
| 22 | 88 | 172 | 240 | 303 | 325 | 368 | 342 | 460 | 497 | 515 | 456 | 436 | 343 | 443 | 493 | 507 | 498 | 440 | | |
| 23 | 92 | 180 | 261 | 317 | 340 | 386 | 363 | 482 | 514 | 529 | 464 | 448 | 354 | 454 | 505 | 519 | 510 | 454 | | |
| 24 | 95 | 183 | 256 | 325 | 353 | 401 | 344 | 464 | 499 | 537 | 470 | 456 | 358 | 465 | 514 | 530 | 518 | 464 | | |
| 25 | 99 | 191 | 268 | 339 | 366 | 417 | 364 | 483 | 515 | 534 | 481 | 458 | 364 | 472 | 522 | 541 | 531 | 479 | | |
| 26 | 102 | 199 | 279 | 352 | 381 | 433 | 347 | 458 | 505 | 530 | 483 | 475 | 367 | 483 | 534 | 554 | 539 | 490 | | |
| 27 | 106 | 206 | 289 | 365 | 395 | 451 | 370 | 475 | 514 | 533 | 484 | 480 | 374 | 493 | 545 | 562 | 551 | 503 | | |
| 28 | 110 | 214 | 299 | 378 | 410 | 467 | 340 | 449 | 498 | 537 | 501 | 458 | 380 | 503 | 555 | 573 | 565 | 515 | | |
| 29 | 114 | 221 | 310 | 381 | 424 | 484 | 370 | 469 | 507 | 500 | 475 | 467 | 385 | 510 | 566 | 583 | 571 | 526 | | |
| 30 | 118 | 229 | 320 | 393 | 439 | 501 | 341 | 462 | 503 | 502 | 480 | 463 | 392 | 518 | 573 | 592 | 582 | 538 | | |
| 31 | 122 | 235 | 331 | 418 | 453 | 518 | 374 | 483 | 517 | 518 | 460 | 472 | 398 | 527 | 586 | 603 | 590 | 549 | | |
| 32 | 126 | 244 | 342 | 419 | 468 | 533 | 351 | 444 | 496 | 490 | 457 | 457 | 442 | 564 | 618 | 632 | 625 | 565 | | |
| 33 | 96 | 186 | 259 | 324 | 391 | 448 | 368 | 483 | 505 | 486 | 482 | 461 | 382 | 520 | 579 | 597 | 598 | 548 | | |
| 34 | 99 | 192 | 267 | 334 | 402 | 461 | 344 | 445 | 497 | 492 | 469 | 467 | 386 | 519 | 584 | 605 | 605 | 557 | | |
| 35 | 102 | 197 | 274 | 343 | 414 | 475 | 369 | 460 | 508 | 500 | 455 | 458 | 390 | 526 | 593 | 613 | 615 | 566 | | |
| 36 | 105 | 203 | 282 | 353 | 426 | 489 | 335 | 434 | 506 | 505 | 458 | 464 | 397 | 535 | 602 | 621 | 622 | 575 | | |
| 37 | 108 | 209 | 290 | 362 | 437 | 502 | 364 | 460 | 501 | 507 | 462 | 469 | 399 | 540 | 609 | 628 | 632 | 583 | | |
| 38 | 110 | 214 | 298 | 372 | 448 | 516 | 341 | 433 | 467 | 488 | 466 | 470 | 405 | 545 | 616 | 634 | 637 | 590 | | |
| 39 | 114 | 220 | 306 | 381 | 459 | 529 | 369 | 454 | 454 | 502 | 459 | 325 | 409 | 553 | 621 | 641 | 644 | 598 | | |
| 40 | 115 | 224 | 308 | 388 | 467 | 541 | 342 | 445 | 477 | 508 | 474 | 330 | 423 | 563 | 629 | 645 | 648 | 604 | | |
| 41 | 118 | 230 | 317 | 396 | 479 | 553 | 371 | 458 | 492 | 508 | 480 | 336 | 419 | 565 | 632 | 652 | 655 | 611 | | |
| 42 | 121 | 235 | 325 | 406 | 490 | 567 | 320 | 432 | 480 | 507 | 477 | 334 | 423 | 569 | 637 | 655 | 657 | 615 | | |
| 43 | 124 | 241 | 332 | 415 | 501 | 580 | 339 | 452 | 475 | 477 | 336 | 341 | 427 | 573 | 644 | 662 | 664 | 623 | | |
| 44 | 127 | 245 | 339 | 424 | 512 | 594 | 324 | 438 | 474 | 465 | 339 | 340 | 434 | 580 | 650 | 668 | 667 | 629 | | |
| 45 | 130 | 252 | 347 | 433 | 524 | 607 | 348 | 457 | 481 | 489 | 346 | 347 | 434 | 585 | 655 | 673 | 673 | 637 | | |
| 46 | 133 | 257 | 354 | 443 | 535 | 620 | 327 | 445 | 468 | 481 | 349 | 345 | 437 | 588 | 659 | 677 | 677 | 643 | | |
| 47 | 136 | 263 | 363 | 452 | 546 | 633 | 356 | 458 | 486 | 501 | 353 | 353 | 442 | 593 | 665 | 682 | 682 | 651 | | |
| 48 | 139 | 269 | 371 | 463 | 556 | 647 | 343 | 413 | 470 | 381 | 355 | 356 | 474 | 631 | 699 | 715 | 713 | 671 | | |

FIG. 5B

TABLE 2

| K | N=16 ($\delta_y$=1) type, $\delta_x$ | N=32 ($\delta_y$=2) type, $\delta_x$ | N=48 ($\delta_y$=3) type, $\delta_x$ | N=64 ($\delta_y$=4) type, $\delta_x$ | N=80 ($\delta_y$=5) type, $\delta_x$ | N=96 ($\delta_y$=6) type, $\delta_x$ |
|---|---|---|---|---|---|---|
| 2  | ConstK 8  | ConstK 4 | ConstK 4 | ConstK 4 | ConstK 4 | ConstK 4 |
| 3  | ConstK 8  | ConstK 5 | ConstK 5 | ConstK 4 | ConstK 5 | ConstK 8 |
| 4  | ConstK 14 | ConstK 4 | ConstK 4 | ConstK 4 | ConstK 4 | ConstK 8 |
| 5  | ConstK 11 | ConstK 6 | ConstK 4 | ConstK 4 | ConstK 4 | ConstK 6 |
| 6  | ConstK 10 | ConstK 8 | ConstK 5 | ConstK 4 | ConstK 4 | ConstK 8 |
| 7  | ConstK 11 | ConstK 8 | ConstK 4 | ConstK 4 | VarK 4   | ConstK 8 |
| 8  | ConstK 10 | ConstK 8 | ConstK 4 | ConstK 4 | VarK 4   | ConstK 8 |
| 9  | ConstK 7  | ConstK 8 | ConstK 5 | ConstK 4 | VarK 4   | VarK 7   |
| 10 | ConstK 11 | ConstK 8 | VarK 4   | ConstK 4 | VarK 4   | ConstK 6 |
| 11 | ConstK 10 | ConstK 7 | VarK 4   | ConstK 4 | VarK 4   | VarK 7   |
| 12 | ConstK 10 | ConstK 8 | ConstK 5 | ConstK 4 | VarK 4   | VarK 7   |
| 13 | ConstK 10 | ConstK 8 | ConstK 5 | ConstK 4 | VarK 4   | VarK 7   |
| 14 | ConstK 9  | ConstK 8 | ConstK 5 | ConstK 4 | VarK 4   | VarK 7   |
| 15 | ConstK 9  | ConstK 8 | ConstK 5 | ConstK 4 | VarK 4   | VarK 7   |
| 16 | VarK 7    | ConstK 8 | VarK 4   | ConstK 4 | VarK 4   | VarK 5   |
| 17 | ConstK 10 | ConstK 8 | ConstK 5 | ConstK 4 | VarK 4   | ConstK 8 |
| 18 | ConstK 9  | ConstK 8 | ConstK 5 | ConstK 4 | VarK 4   | VarK 6   |
| 19 | ConstK 7  | ConstK 8 | ConstK 5 | ConstK 4 | VarK 4   | VarK 6   |
| 20 | ConstK 8  | ConstK 7 | ConstK 5 | ConstK 4 | VarK 4   | VarK 6   |
| 21 | ConstK 8  | ConstK 7 | ConstK 5 | ConstK 4 | VarK 4   | VarK 6   |
| 22 | VarK 7    | ConstK 6 | ConstK 5 | ConstK 6 | VarK 4   | VarK 6   |
| 23 | ConstK 7  | ConstK 6 | ConstK 8 | ConstK 6 | VarK 4   | VarK 6   |

FIG. 6A

TABLE 2 (CONTINUED)

| | | | | | | | | | | | | |
|---|---|---|---|---|---|---|---|---|---|---|---|---|
| 24 | VarK | 7 | VarK | 9 | VarK | 7 | ConstK | 6 | VarK | 4 | VarK | 7 |
| 25 | VarK | 7 | ConstK | 8 | VarK | 4 | VarK | 5 | VarK | 4 | VarK | 7 |
| 26 | VarK | 7 | VarK | 9 | VarK | 7 | VarK | 5 | VarK | 4 | VarK | 7 |
| 27 | VarK | 7 | VarK | 9 | VarK | 7 | VarK | 5 | VarK | 4 | VarK | 7 |
| 28 | VarK | 14 | VarK | 9 | VarK | 7 | VarK | 5 | VarK | 4 | VarK | 7 |
| 29 | VarK | 7 | VarK | 9 | VarK | 7 | VarK | 5 | VarK | 4 | VarK | 7 |
| 30 | VarK | 14 | VarK | 9 | VarK | 7 | VarK | 5 | VarK | 4 | VarK | 7 |
| 31 | VarK | 14 | VarK | 9 | VarK | 7 | VarK | 5 | VarK | 4 | VarK | 7 |
| 32 | VarK | 7 | VarK | 9 | VarK | 4 | VarK | 5 | VarK | 4 | VarK | 6 |
| 33 | VarK | 7 | VarK | 5 | VarK | 4 | VarK | 5 | VarK | 4 | VarK | 6 |
| 34 | VarK | 7 | VarK | 5 | VarK | 7 | VarK | 5 | VarK | 4 | VarK | 6 |
| 35 | VarK | 7 | VarK | 9 | VarK | 7 | VarK | 5 | VarK | 4 | VarK | 6 |
| 36 | VarK | 7 | VarK | 9 | VarK | 7 | VarK | 5 | VarK | 4 | VarK | 6 |
| 37 | VarK | 7 | VarK | 9 | VarK | 7 | VarK | 5 | VarK | 4 | VarK | 6 |
| 38 | VarK | 13 | VarK | 9 | VarK | 7 | VarK | 5 | VarK | 4 | VarK | 6 |
| 39 | VarK | 13 | VarK | 9 | VarK | 7 | VarK | 5 | VarK | 4 | VarK | 6 |
| 40 | VarK | 14 | VarK | 9 | VarK | 7 | VarK | 5 | VarK | 4 | VarK | 6 |
| 41 | VarK | 14 | VarK | 9 | VarK | 7 | VarK | 5 | VarK | 4 | VarK | 6 |
| 42 | VarK | 14 | VarK | 9 | VarK | 7 | VarK | 5 | VarK | 4 | VarK | 7 |
| 43 | VarK | 14 | VarK | 9 | VarK | 7 | VarK | 5 | VarK | 4 | VarK | 7 |
| 44 | VarK | 14 | VarK | 9 | VarK | 7 | VarK | 5 | VarK | 4 | VarK | 7 |
| 45 | VarK | 14 | VarK | 9 | VarK | 7 | VarK | 5 | VarK | 4 | VarK | 7 |
| 46 | VarK | 14 | VarK | 9 | VarK | 7 | VarK | 5 | VarK | 4 | VarK | 7 |
| 47 | VarK | 14 | VarK | 9 | VarK | 7 | VarK | 5 | VarK | 4 | VarK | 7 |
| 48 | VarK | 7 | VarK | 9 | VarK | 7 | VarK | 5 | VarK | 4 | VarK | 6 |

FIG. 6B

TABLE 3

| K | Constant-K max/min speed ratio | | | | | | Variable-K max/min speed ratio | | | | | |
|---|---|---|---|---|---|---|---|---|---|---|---|---|
|  | N=16 | N=32 | N=48 | N=64 | N=80 | N=96 | N=16 | N=32 | N=48 | N=64 | N=80 | N=96 |
| 2 | 1.08x | 1.43x | 1.42x | 1.35x | 1.33x | 1.30x | 1.44x | 1.44x | 1.50x | 1.48x | 1.45x | 1.19x |
| 3 | 1.08x | 1.43x | 1.45x | 1.41x | 1.32x | 1.02x | 1.43x | 1.42x | 1.48x | 1.50x | 1.47x | 1.23x |
| 4 | 1.13x | 1.41x | 1.42x | 1.48x | 1.31x | 1.06x | 1.41x | 1.42x | 1.44x | 1.55x | 1.49x | 1.26x |
| 5 | 1.14x | 1.39x | 1.43x | 1.43x | 1.30x | 1.11x | 1.39x | 1.41x | 1.43x | 1.58x | 1.50x | 1.31x |
| 6 | 1.24x | 1.42x | 1.37x | 1.42x | 1.29x | 1.14x | 1.38x | 1.39x | 1.43x | 1.63x | 1.54x | 1.33x |
| 7 | 1.19x | 1.44x | 1.39x | 1.48x | 1.31x | 1.17x | 1.36x | 1.39x | 1.41x | 1.68x | 1.58x | 1.40x |
| 8 | 1.26x | 1.49x | 1.37x | 1.53x | 1.30x | 1.18x | 1.35x | 1.38x | 1.40x | 1.69x | 1.59x | 1.41x |
| 9 | 1.25x | 1.42x | 1.36x | 1.43x | 1.29x | 1.17x | 1.32x | 1.35x | 1.38x | 1.72x | 1.63x | 1.46x |
| 10 | 1.28x | 1.40x | 1.34x | 1.45x | 1.25x | 1.17x | 1.32x | 1.35x | 1.39x | 1.72x | 1.64x | 1.47x |
| 11 | 1.27x | 1.42x | 1.39x | 1.44x | 1.27x | 1.13x | 1.31x | 1.35x | 1.37x | 1.76x | 1.67x | 1.55x |
| 12 | 1.25x | 1.40x | 1.42x | 1.45x | 1.26x | 1.13x | 1.30x | 1.33x | 1.36x | 1.78x | 1.69x | 1.55x |
| 13 | 1.36x | 1.37x | 1.48x | 1.46x | 1.26x | 1.12x | 1.29x | 1.33x | 1.34x | 1.80x | 1.69x | 1.63x |
| 14 | 1.27x | 1.30x | 1.34x | 1.47x | 1.30x | 1.15x | 1.27x | 1.30x | 1.31x | 1.84x | 1.73x | 1.63x |
| 15 | 1.27x | 1.34x | 1.39x | 1.48x | 1.29x | 1.21x | 1.26x | 1.29x | 1.29x | 1.85x | 1.76x | 1.69x |
| 16 | 1.34x | 1.38x | 1.32x | 1.48x | 1.34x | 1.22x | 1.39x | 1.34x | 1.41x | 1.88x | 1.90x | 1.70x |
| 17 | 1.33x | 1.39x | 1.36x | 1.45x | 1.31x | 1.23x | 1.34x | 1.32x | 1.43x | 1.90x | 1.91x | 1.75x |
| 18 | 1.31x | 1.35x | 1.34x | 1.41x | 1.31x | 1.23x | 1.33x | 1.29x | 1.39x | 1.93x | 1.91x | 1.77x |
| 19 | 1.33x | 1.36x | 1.31x | 1.42x | 1.32x | 1.25x | 1.33x | 1.28x | 1.36x | 1.93x | 1.92x | 1.80x |
| 20 | 1.30x | 1.31x | 2.10x | 2.31x | 1.33x | 1.23x | 1.30x | 1.26x | 1.34x | 1.95x | 1.92x | 1.80x |
| 21 | 1.27x | 1.33x | 2.12x | 2.31x | 1.27x | 1.27x | 1.30x | 1.25x | 1.33x | 1.94x | 1.92x | 1.82x |
| 22 | 1.93x | 2.05x | 2.13x | 2.26x | 2.09x | 1.29x | 1.28x | 1.24x | 1.30x | 1.96x | 1.94x | 1.83x |

FIG. 8A

TABLE 3
(CONTINUED)

| | | | | | | | | | | | |
|---|---|---|---|---|---|---|---|---|---|---|---|
| 23 | 2.00x | 2.10x | 2.12x | 2.27x | 2.09x | 1.31x | 1.28x | 1.23x | 1.30x | 1.97x | 1.95x | 1.86x |
| 24 | 1.92x | 2.00x | 2.03x | 2.26x | 2.07x | 2.04x | 1.26x | 1.23x | 1.27x | 1.98x | 1.93x | 1.86x |
| 25 | 2.00x | 2.05x | 2.05x | 2.20x | 2.07x | 2.01x | 1.25x | 1.22x | 1.26x | 1.98x | 1.94x | 1.89x |
| 26 | 1.88x | 1.93x | 1.99x | 2.08x | 2.04x | 2.00x | 1.24x | 1.22x | 1.25x | 2.00x | 1.94x | 1.90x |
| 27 | 1.90x | 1.92x | 1.95x | 2.09x | 2.03x | 1.87x | 1.24x | 1.22x | 1.25x | 1.98x | 1.93x | 1.93x |
| 28 | 1.80x | 1.83x | 1.90x | 1.89x | 2.02x | 1.90x | 1.23x | 1.22x | 1.23x | 2.00x | 1.97x | 1.94x |
| 29 | 1.92x | 1.89x | 1.91x | 1.92x | 1.88x | 1.89x | 1.22x | 1.21x | 1.23x | 1.99x | 1.94x | 1.95x |
| 30 | 1.77x | 1.81x | 1.89x | 1.87x | 1.89x | 1.84x | 1.22x | 1.21x | 1.21x | 2.01x | 1.96x | 1.98x |
| 31 | 1.88x | 1.87x | 1.89x | 1.88x | 1.76x | 1.87x | 1.21x | 1.21x | 1.22x | 2.00x | 1.95x | 2.00x |
| 32 | 1.73x | 1.66x | 1.77x | 1.77x | 1.71x | 1.76x | 1.29x | 1.21x | 1.26x | 2.04x | 2.04x | 2.01x |
| 33 | 1.89x | 1.70x | 1.78x | 1.74x | 1.72x | 1.76x | 1.27x | 1.22x | 1.27x | 2.03x | 2.03x | 2.04x |
| 34 | 1.70x | 1.67x | 1.77x | 1.73x | 1.74x | 1.75x | 1.26x | 1.20x | 1.26x | 2.05x | 2.05x | 2.04x |
| 35 | 1.86x | 1.75x | 1.77x | 1.73x | 1.85x | 1.72x | 1.26x | 1.20x | 1.26x | 2.05x | 2.04x | 2.05x |
| 36 | 1.74x | 1.60x | 1.74x | 1.74x | 1.64x | 1.71x | 1.25x | 1.20x | 1.25x | 2.06x | 2.04x | 2.06x |
| 37 | 1.77x | 1.63x | 1.70x | 1.79x | 1.67x | 1.76x | 1.24x | 1.19x | 1.25x | 2.07x | 2.05x | 2.07x |
| 38 | 1.76x | 1.63x | 1.61x | 1.77x | 1.73x | 1.82x | 1.24x | 1.19x | 1.24x | 2.06x | 2.05x | 2.07x |
| 39 | 1.81x | 1.66x | 1.64x | 1.84x | 1.79x | 1.28x | 1.23x | 1.19x | 1.23x | 2.05x | 2.05x | 2.09x |
| 40 | 1.76x | 1.59x | 1.61x | 1.66x | 1.85x | 1.33x | 1.24x | 1.19x | 1.22x | 2.05x | 2.03x | 2.06x |
| 41 | 1.86x | 1.67x | 1.64x | 1.64x | 1.90x | 1.35x | 1.22x | 1.19x | 1.21x | 2.07x | 2.04x | 2.10x |
| 42 | 1.58x | 1.60x | 1.60x | 1.64x | 1.91x | 1.34x | 1.22x | 1.19x | 1.21x | 2.07x | 2.04x | 2.11x |
| 43 | 1.62x | 1.65x | 1.60x | 1.59x | 1.33x | 1.35x | 1.21x | 1.18x | 1.21x | 2.07x | 2.04x | 2.12x |
| 44 | 1.60x | 1.59x | 1.58x | 1.54x | 1.33x | 1.34x | 1.21x | 1.18x | 1.20x | 2.08x | 2.04x | 2.11x |
| 45 | 1.66x | 1.61x | 1.58x | 1.64x | 1.35x | 1.34x | 1.20x | 1.18x | 1.20x | 2.07x | 2.03x | 2.13x |
| 46 | 1.63x | 1.55x | 1.54x | 1.60x | 1.22x | 1.34x | 1.20x | 1.18x | 1.19x | 2.07x | 2.04x | 2.14x |
| 47 | 1.67x | 1.55x | 1.58x | 1.84x | 1.21x | 1.35x | 1.20x | 1.18x | 1.19x | 2.06x | 2.03x | 2.16x |
| 48 | 1.81x | 1.48x | 1.64x | 1.21x | 1.19x | 1.12x | 1.23x | 1.19x | 1.24x | 2.11x | 2.10x | 2.17x |
| Avg: | 1.56x | 1.59x | 1.64x | 1.69x | 1.55x | 1.42x | 1.28x | 1.26x | 1.30x | 1.92x | 1.87x | 1.82x |

FIG. 8B

TABLE 4

| K | N=16 | N=32 | N=48 | N=64 | N=80 | N=96 |
|---|------|------|------|------|------|------|
| 2 | 5.63x | 3.33x | 2.50x | 2.11x | 1.84x | 1.67x |
| 3 | 5.44x | 3.22x | 2.43x | 2.09x | 1.74x | 1.26x |
| 4 | 5.28x | 3.25x | 2.41x | 2.08x | 1.63x | 1.25x |
| 5 | 5.07x | 3.07x | 2.38x | 1.98x | 1.59x | 1.22x |
| 6 | 4.97x | 2.99x | 2.26x | 1.94x | 1.56x | 1.18x |
| 7 | 4.82x | 2.95x | 2.19x | 1.91x | 1.53x | 1.17x |
| 8 | 4.74x | 3.02x | 2.14x | 1.91x | 1.50x | 1.19x |
| 9 | 4.44x | 2.82x | 2.06x | 1.77x | 1.49x | 1.13x |
| 10 | 4.22x | 2.72x | 2.03x | 1.73x | 1.46x | 1.12x |
| 11 | 4.06x | 2.65x | 1.99x | 1.70x | 1.45x | 1.11x |
| 12 | 3.80x | 2.53x | 1.98x | 1.67x | 1.43x | 1.10x |
| 13 | 3.69x | 2.46x | 1.96x | 1.65x | 1.39x | 1.08x |
| 14 | 3.45x | 2.31x | 1.88x | 1.61x | 1.36x | 1.06x |
| 15 | 3.51x | 2.32x | 1.85x | 1.59x | 1.33x | 1.05x |
| 16 | 3.24x | 2.28x | 1.87x | 1.54x | 1.36x | 1.02x |
| 17 | 5.11x | 3.43x | 2.42x | 1.97x | 1.68x | 1.29x |
| 18 | 4.69x | 3.19x | 2.32x | 1.88x | 1.66x | 1.27x |
| 19 | 4.79x | 3.17x | 2.29x | 1.87x | 1.63x | 1.25x |
| 20 | 4.32x | 2.93x | 2.19x | 1.78x | 1.59x | 1.23x |
| 21 | 4.33x | 2.93x | 2.16x | 1.75x | 1.56x | 1.22x |
| 22 | 3.91x | 2.67x | 2.07x | 1.70x | 1.53x | 1.20x |
| 23 | 3.96x | 2.69x | 2.05x | 1.67x | 1.50x | 1.18x |
| 24 | 3.78x | 2.54x | 2.00x | 1.65x | 1.47x | 1.16x |

FIG. 9A

TABLE 4
(CONTINUED)

| | | | | | | |
|---|---|---|---|---|---|---|
| 25 | 3.69x | 2.53x | 1.95x | 1.60x | 1.45x | 1.15x |
| 26 | 3.59x | 2.43x | 1.92x | 1.58x | 1.41x | 1.13x |
| 27 | 3.52x | 2.39x | 1.89x | 1.54x | 1.39x | 1.12x |
| 28 | 3.46x | 2.35x | 1.86x | 1.52x | 1.38x | 1.10x |
| 29 | 3.38x | 2.31x | 1.83x | 1.53x | 1.35x | 1.09x |
| 30 | 3.33x | 2.26x | 1.79x | 1.50x | 1.33x | 1.07x |
| 31 | 3.27x | 2.23x | 1.77x | 1.44x | 1.30x | 1.06x |
| 32 | 3.51x | 2.31x | 1.81x | 1.51x | 1.33x | 1.06x |
| 33 | 3.98x | 2.79x | 2.24x | 1.84x | 1.53x | 1.22x |
| 34 | 3.90x | 2.71x | 2.19x | 1.81x | 1.50x | 1.21x |
| 35 | 3.83x | 2.66x | 2.16x | 1.79x | 1.49x | 1.19x |
| 36 | 3.79x | 2.63x | 2.13x | 1.76x | 1.46x | 1.18x |
| 37 | 3.71x | 2.59x | 2.10x | 1.73x | 1.45x | 1.16x |
| 38 | 3.67x | 2.55x | 2.07x | 1.71x | 1.42x | 1.14x |
| 39 | 3.60x | 2.51x | 2.03x | 1.68x | 1.40x | 1.13x |
| 40 | 3.67x | 2.51x | 2.04x | 1.66x | 1.39x | 1.12x |
| 41 | 3.54x | 2.46x | 2.00x | 1.65x | 1.37x | 1.10x |
| 42 | 3.48x | 2.42x | 1.96x | 1.61x | 1.34x | 1.08x |
| 43 | 3.44x | 2.38x | 1.94x | 1.60x | 1.33x | 1.07x |
| 44 | 3.42x | 2.36x | 1.92x | 1.57x | 1.30x | 1.06x |
| 45 | 3.34x | 2.32x | 1.89x | 1.55x | 1.28x | 1.05x |
| 46 | 3.30x | 2.28x | 1.86x | 1.53x | 1.27x | 1.04x |
| 47 | 3.26x | 2.25x | 1.83x | 1.51x | 1.25x | 1.03x |
| 48 | 3.42x | 2.35x | 1.89x | 1.54x | 1.28x | 1.04x |
| Avg: | 3.97x | 2.64x | 2.05x | 1.71x | 1.45x | 1.15x |

SYSTEM AND METHOD FOR SPEEDING UP GENERAL MATRIX-MATRIX MULTIPLICATION ON THE GPU

FIELD

The present disclosure generally relates to general matrix-matrix multiplication (GEMM) on a graphics processing unit (GPU). More specifically, the present disclosure relates to a method and system for time- and space-efficient GEMM on a GPU that leverages a set of GPU kernels with complementary strength for matrices of various sizes.

RELATED ART

GEMM is a key linear-algebra operation commonly used in math programming software such as UNPACK, MATLAB, and R. It is a level 3 basic linear algebra subprogram (BLAS), a de facto standard API for linear algebra libraries and routines. Mathematically, GEMM performs the computation $C=\alpha AB+\beta C$ where matrices A, B, C are $M \times K$, $K \times N$, $M \times N$ respectively, and $\alpha$, $\beta$ are scalars.

The computation complexity of GEMM is O(MNK), which increases quickly with the sizes of the matrices. The high computational intensity of GEMM makes it ideal for a GPU, which has significantly more processor cores capable of high-throughput floating-point calculations than does the CPU. With the advent of general purpose computing on graphics processing units (GPGPU), many numerical computation techniques can now be implemented efficiently on modern GPUs with substantial speed gains compared to their CPU-based implementations. For dense linear algebra operations such as GEMM, the GPU enjoys a significant speed advantage over the CPU. However, there remains a need to improve the performance of GEMM on the GPU.

SUMMARY

One embodiment of the present invention provides a method for performing a GEMM operation. During operation, the system may generate a set of kernels that includes at least one of a variable-K GEMM kernel and a constant-K GEMM kernel. The system may receive data representing at least two matrices. The system may then determine a set of row and column parameters associated with the two matrices, in which the set of row and column parameters indicate a number of rows and a number of columns of a first matrix and a number of columns of a second matrix. The system may subsequently select a kernel from the set of kernels for performing the GEMM operation, which involves accessing a set of rules. Note that a rule of the set of rules maps a respective set of row and column parameters to a respective kernel from the set of kernels. The selected kernel performs the GEMM operation faster than any other kernel in the set of kernels for the respective set of row and column parameters. The system may then perform the GEMM operation on the two matrices using the selected kernel.

In a variation on this embodiment, the set of kernels includes a variable-K GEMM kernel. The system may generate the variable-K GEMM kernel to perform GEMM operations in which a number of rows $TB_x$ of a matrix A that are processed by a thread block and a number of columns $TB_y$ of a matrix B that are processed by the thread block are not always the same value, $TB_x$ is equal to a multiple of a row-stop value, and $TB_y$ is equal to a multiple of a column-stop value.

In a variation on this embodiment, the set of kernels includes a constant-K GEMM kernel. The system may generate the constant-K GEMM kernel to perform GEMM operations in which a number of rows $TB_x$ of a matrix A that are processed by a thread block and a number of columns $TB_y$ of a matrix B that are processed by the thread block are not always the same value, $TB_x$ is equal to a multiple of a row-stop value, and $TB_y$ is equal to a multiple of a column-stop value.

In a variation on this embodiment, the set of kernels includes a constant-K GEMM kernel. The system may generate the constant-K GEMM kernel to perform GEMM operations on matrices in which the number of columns of a matrix $A_1$ is equal to a constant $K_1$ value. The system may also generate a second constant-K GEMM kernel for performing GEMM operations on matrices in which the number of columns of another matrix $A_2$ is equal to a constant $K_2$ value, in which $K_1$ is not equal to $K_2$.

In a variation on this embodiment, the system may generate a kernel that is a variable-dimension constant-K GEMM kernel.

In a variation on this embodiment, the system may generate the set of rules, which involves determining computation times for each kernel of the set of kernels when performing GEMM operations involving matrices with various dimensions. The system may add, to the set of rules, a rule mapping a set of row and column parameters to a kernel with a computation time that is faster than any other kernel for the set of row and column parameters.

In a further variation, the system may use a constant parameter (e.g., M) combined with other variable parameters (e.g., N and K) to reduce a number of tests required.

In a further variation, the system may perform non-uniform sampling density along M, N, and K axes of a (e.g., Smart GEMM) three-dimensional testing space to obtain a set of <M, N, K> test triples.

In a variation on this embodiment, the system may generate a rule database (e.g., Smart GEMM rules database) that allows the storage, transfer, sharing, and query of test results (e.g., Smart GEMM testing results) among multiple homogeneous GPUs, in order to select the best GEMM kernel for a given set of {M, N, K} parameters without redundant tests.

In a variation on this embodiment, the system may, in response to determining that a search for a particular {M, N, K} parameter combination in the set of rules fails, perform a search in the set of rules to find a most similar rule according to predetermined thresholds for at least one of the M, N, and K values.

In a further variation, the system may use a non-negative parameter distance function to determine a proximity of rules in order to determine the most similar rule for the particular {M, N, K} parameter combination.

In a variation on this embodiment, selecting a kernel may further include selecting a variable-K kernel mapped from a largest ⟨N, K⟩ available in a rules database, wherein the largest ⟨N, K⟩ is determined by a maximum product of N and K.

In a variation on this embodiment, the system may perform testing to determine a GEMM kernel that is faster than other kernels for performing GEMM operations on matrices associated with a set of {M, N, K} parameters; and update a rules database to include a rule mapping the set of {M, N, K} parameters to the GEMM kernel that is faster than other kernels.

In a variation on this embodiment, the system may apply a GEMM kernel to matrices stored in row-major order without storage padding or apply the GEMM kernel to matrices stored in column-major order without storage padding.

In a variation on this embodiment, the system may use multiple dimensions of a GPU thread grid to encode the coordinate of a thread block, thereby increasing a number of rows or columns of matrices used in matrix multiplication.

In a variation on this embodiment, the system may use on-line testing to find a best GEMM kernel, which the system may use to solve a novel problem instance with parameters that are not in the rules database. The system may add the newly discovered rule to the rules database to prevent redundant tests on the same parameters in the future.

BRIEF DESCRIPTION OF THE FIGURES

FIG. 2 presents a diagram illustrating GEMM with variable-dimension kernels, in accordance with an embodiment of the present invention.

FIG. 3 presents the pseudocode of a Smart GEMM testing technique, in accordance with an embodiment of the present invention.

FIG. 5A-5B presents Table 1 which shows the performance of the best GEMM kernels of each type.

FIG. 6A-6B presents Table 2 which shows optimal GEMM kernel types and values of $\delta_x$.

FIG. 8A-8B presents Table 3 which shows the ratio of the maximum and the minimum GEMM speed achieved by variable-dimension kernels.

FIG. 9A-9B presents Table 4 which shows the speedup of Smart GEMM kernels against the best fixed-dimension kernel.

In the figures, like reference numerals refer to the same figure elements.

DETAILED DESCRIPTION

Figure 1:
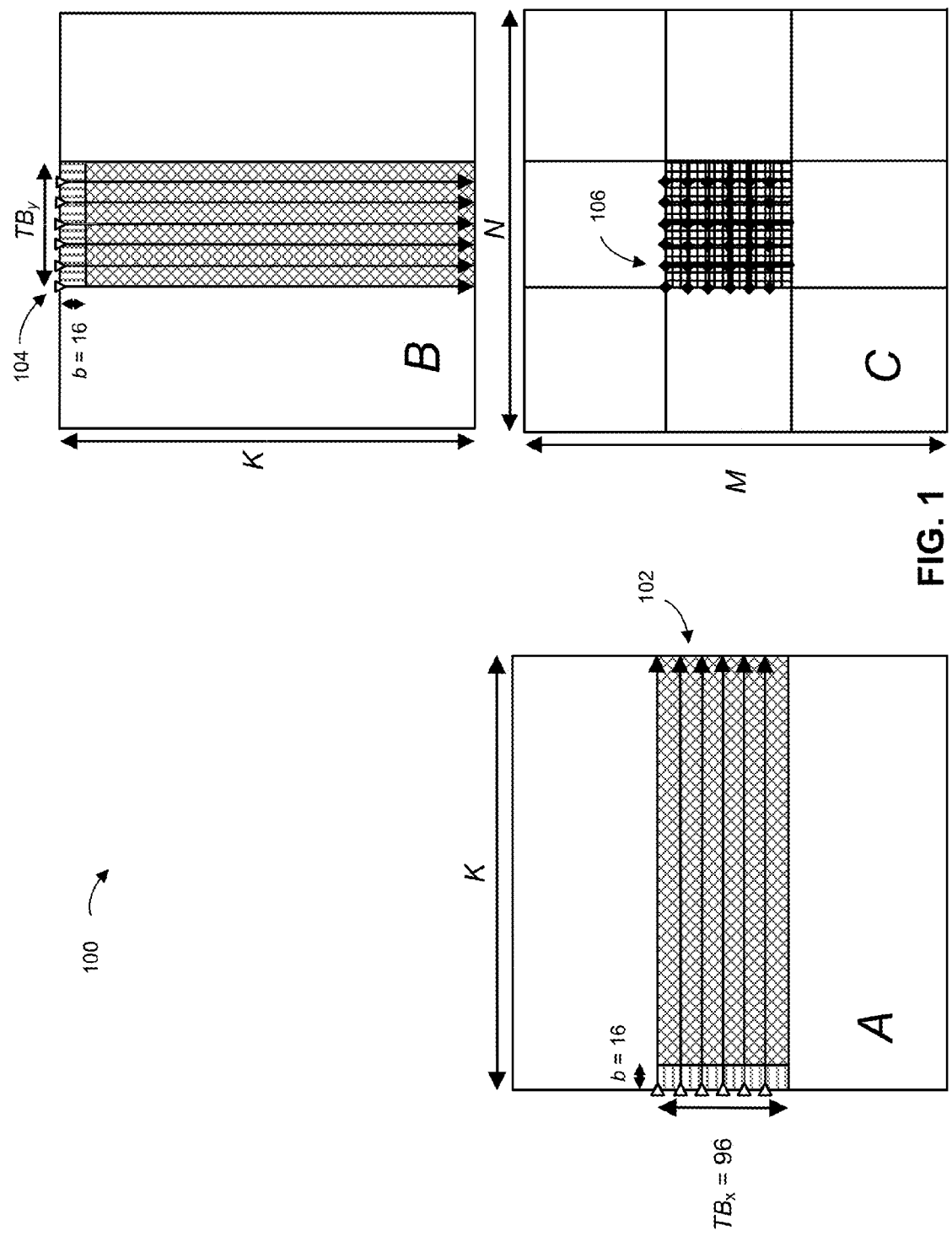
FIG. 1 presents a diagram illustrating rows of matrix A and columns of matrix B processed by a thread block to compute a sub-matrix of C, according to one approach for performing GEMM.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

Overview

Embodiments of the present invention solve the problem of improving performance of GEMM operations by introducing techniques for generating new kernels that can efficiently perform GEMM operations for matrices with specific combinations of row and column parameters. A kernel is a function that executes on a GPU. Multiple threads may execute the kernel in parallel on the GPU. A GEMM kernel is called an a kernel if, for at least one combination of row and column parameters, the kernel is the best (e.g., fastest) kernel among a set of GEMM kernels that can perform a GEMM operation for matrices with the combination of row and column parameters. The parameters of matrices may be represented by {M, N, K}, where M is the number of rows of a first matrix, matrix A, K is the number of columns of matrix A and the number of rows of a second matrix, matrix B, and N is the number of columns of matrix B.

This disclosure describes time- and space-efficient GEMM on a GPU that leverages a set of GPU kernels with complementary strength for matrices of various sizes. GEMM is at the heart of any dense linear algebra package such as UNPACK, MATLAB, and R. In particular, the disclosed technique outperforms the highly optimized Matrix Algebra on GPU and Multicore Architectures (MAGMA) dense linear algebra library on GEMM operations that involve tall-and-skinny matrices (e.g., those with millions of rows but only a few dozen columns). Unlike existing approaches, this technique does not assume that the matrices have any storage padding that can potentially waste a great deal of space, especially on tall-and-skinny matrices. Besides GEMM, the same technique promises to speed up a wide variety of machine learning techniques that share a similar data access pattern yet have little to do with linear algebra.

This disclosure provides a foundation for the efficient implementation of GPU-accelerated machine learning and data mining techniques which must deal with datasets of various dimensions. Machine learning techniques such as k-means clustering and support vector machines can be viewed as special cases of GEMM-like computation with bias towards tall-and-skinny matrices.

A system for performing GEMM operations may initially generate kernels and associated rules to select the best kernels for performing GEMM operations. In some embodiments, the system may generate constant-K GEMM kernels and variable-dimension GEMM kernels. A constant-K GEMM kernel performs GEMM operations for a specific value of K. The system may select a constant-K GEMM kernel for matrices with a parameter combination that includes a K value matching the K value of the selected constant-K GEMM kernel. Variable-dimension GEMM kernels allow for flexibility in the number of rows and columns (e.g., sizes of $TB_x$ and $TB_y$) used by a thread block in computing a sub-matrix. The system may select the best variable-dimension GEMM kernel for performing computations according to the particular parameter combination of the matrices being multiplied. In some embodiments, the system can generate and use variable-dimension constant-K GEMM kernels.

In some embodiments, the system may perform a series of tests to determine the best kernel for performing a GEMM operation on matrices with particular row and column parameters. The system can store test results in a lookup table. The system can generate a rule each time the system determines the fastest kernel from test results, and add the rule to a set of rules stored in a database. The system may then apply the rules to select the best kernel (e.g., the smart kernel) for performing a GEMM operation on matrices with particular row and column parameters.

The system need only perform the experiments once to determine the best kernels for particular combinations of row and column parameters, and whether a kernel is the best kernel for a particular parameter combination does not vary with time. Note that a smart kernel may correctly perform GEMM operations for matrices with a wide variety of row and column parameters, although it is not necessarily the fastest kernel for row and column parameter combinations that are not indicated in a rule for the smart kernel.

MAGMA and Computing a Sub-Matrix

FIG. 1 presents a diagram 100 illustrating rows of matrix A 102 and columns of matrix B 104 processed by a thread block to compute a sub-matrix of C 106, according to one approach for performing GEMM. Matrix Algebra on GPU and Multicore Architectures (MAGMA) is a state-of-the-art dense linear algebra library that offers highly optimized GEMM routines specifically tuned for the latest GPUs including NVIDIA's Fermi and Kepler GPUs. MAGMA divides up the computation of the resulting matrix C into sub-matrices, each of which is processed by a 16×16 thread block (TB). Each TB is responsible for processing $TB_x$ rows of matrix A and $TB_y$ columns of matrix B, as illustrated by the two gray areas in FIG. 1. To compute a sub-matrix of C, a TB uses [K/b] iterations, each responsible for multiplying $TB_x$ rows and b columns of A with b rows and $TB_y$ columns of B, where b is the block size typically set to be the maximum number of contiguous memory accesses that can be combined into a single "coalesced" memory transaction. For NVIDIA GPUs, b is 16, half of the size of a warp, which is a group of 32 threads in a single streaming multiprocessor (SM) of the GPU.

The optimal $TB_x$ and $TB_y$ depend on many factors of the GPU, including the maximum number of registers per thread, the size of shared memory on each SM, and the number of threads in a TB. For Fermi GPUs, MAGMA uses $TB_x=TB_y=96$ as its GEMM parameters, which tend to optimize performance for large matrices. That is, a single TB computes a 96×96 sub-matrix of C, writing a total of 96×96=9,216 elements. Because the size of a TB is 16×16, each of the 256 threads is responsible for computing 9,216/256=36 elements of the sub-matrix of C, with stride 16.

FIG. 1 illustrates an arrangement in which thread (0, 0), the first of 256 threads, is responsible for multiplying 6 rows of A marked by ▷ with 6 columns of B marked by ▽. As a result, thread (0, 0) computes 6×6=36 elements of C, as marked by ◆ in FIG. 1. With stride 16, it can be shown that multiple writes to the resulting matrix C are combined into fewer coalesced memory transactions, which are important for high-throughput GEMM.

Although MAGMA's GEMM has shown impressive speed ups against CPU-based implementations, it can still suffer from low parallel efficiency, as the shapes of A and B deviate significantly from the square matrices illustrated in FIG. 1. In particular, if one of the matrices is tall-and-skinny, e.g., M>>1,000 and K≤96, MAGMA can only achieve a tiny fraction of its peak GEMM performance, even when the amount of computation, which is proportional to the product of M, N, and K, is large. In other words, the performance of GEMM depends not only on M×N×K being sufficiently large, but also on their respective values. For MAGMA, the best scenario occurs when M=N=K>>96, which is how the default testing parameters are set for GEMM. However, in worst-case scenarios such as M>>N=K=2, it becomes inefficient to use the same parameters $TB_x=TB_y=96$ and b=16, because MAGMA's assumption that N>>$TB_y$=96 and K>>b=16 may not hold. For example, when K=2, the block size b would effectively become 2 instead of 16, resulting in 8× less data transferred by the same number of memory transactions. As another example, when N≤80, each thread can only compute up to 6×[N/16]≤30 elements of C, less than the 36 elements computed in the nominal case. In general, the more M, N, and K deviate from their best-case values (i.e., M=N=K>>96), the higher the risk MAGMA would underutilize the GPU hardware, leading to sub-optimal parallelization.

MAGMA stores matrices in column-major order. For optimal performance, it is best that the start address of each column be 128-byte aligned (i.e., the address is divisible by 128). This is done by adding zeroes to the end of each column (except for the last one) such that the start address of the next column is still 128-byte aligned. The extra zeroes at the end of each column are storage paddings that should not affect the GEMM results. Nevertheless, they can take up a significant portion of the space, especially for small K's. For example, when K=2, the storage paddings account for 93.75% of the space, and only 6.25% is used to store the actual matrix B. Similarly, when M=2, the same 6.25% storage efficiency applies to matrices A and C. Unlike MAGMA, the techniques described in this disclosure achieve high-performance GEMM without any storage padding.

Kernel Functions with Complementary Strength

The starting point of this disclosure is the observation that a single GEMM kernel implementation on the GPU, no matter how optimized, may not perform well for all possible matrix sizes in terms of M, N, and K. Thus, a more practical strategy is to have a collection of GEMM techniques from which the best one can be selected given the sizes of the matrices. To do so with the GPU, the disclosed techniques use a set of kernel functions with complementary strength such that the exclusion of any kernel in the set would result in degraded GEMM performance for some values of M, N, and K.

A kernel function $f$ is useful with respect to a set of kernel functions F, if and only if its performance is strictly better than all the rest of kernels $f' \in F$ for at least one problem instance. In the rare event that two potentially useful kernel functions have exactly the same performance on all possible problem instances, one can randomly pick one and discard the other as useless. With proper tie-breaking, the set of useful kernel functions is unique for any collection of kernel functions that solve the same type of problems. To determine their usefulness, kernel functions are tested over a range of problem instances and compared against one another for best performance. In practice, testing kernel functions on all problem instances is not required, which is especially true for operations like GEMM that only takes discrete values of M, N, and K as performance-affecting parameters.

An interesting question is how to come up with an initial set of candidate functions from which the useful ones can be selected. This motivates a more thorough exploration of the design space for GEMM techniques than previously studied.

Described below is a set of techniques along which the GEMM design space is explored in this disclosure.

Constant-K Vs Variable-K GEMM Kernels

Loop unrolling is a technique for speeding up GPU kernel functions with an iterative structure, especially if the number of times the loop will be executed can be determined at compile time. But oftentimes the exact loop counts are unknown until the execution of the kernel, limiting the level of compile-time optimization performed on the kernel. For improved efficiency, this disclosure distinguishes two basic types of GEMM kernels:

constant-K GEMM kernels, each of which handles a specific value of K, but all values of M and N variable-K GEMM kernels, each of which handles all values of K, and all values of M and N.

Although less general, constant-K GEMM kernels can run faster, because better optimized code can be generated if K is known at compile time. More importantly, constant-K kernels can save shared memory, which is limited to 48 KB per SM on NVIDIA's GPUs, by allocating the precise amount that is needed for a specific value of K rather than for all possible values. This makes it possible for the GPU to have more active TBs at the same time, because more of them can fit in the 48 KB of shared memory on a SM. For small K's, constant-K GEMM kernels can store more rows (columns) of the matrix A (matrix B) in shared memory, resulting in more elements of C computed by a single TB and thereby improving performance. Optimizing the use of shared memory is important for GEMM, because the best implementations always load the sub-matrices of A and B into shared memory, which is much faster than global memory, before multiplying them on the GPU. Note that MAGMA only has variable-K kernels for GEMM, and the concept of constant-K kernels (or any constant-parameter BLAS kernels) is new. As the experiments will show, constant-K kernels perform the best for small K's, and thus only a small number of constant-K kernels need to be included in the GEMM implementation.

Variable-Dimension GEMM Kernels

Recall MAGMA uses fixed $TB_x=TB_y=96$ as GEMM parameters for NVIDIA's Fermi (and Kepler) GPUs. As mentioned earlier, this tends to optimize GEMM performance on large square matrices. However, the same parameters may not perform well on non-square matrices such as tall-and-skinny ones. Rather than forcing $TB_x=TB_y=96$, this disclosure introduces a new class of GEMM kernels, called variable-dimension GEMM kernels, that offer more flexibility in the sizes of $TB_x$ and $TB_y$ used by a thread block.

FIG. 2 presents a diagram 200 illustrating GEMM with variable-dimension kernels, in accordance with an embodiment of the present invention. As illustrated in FIG. 2, the new variable-dimension kernels can implement any combinations of $TB_x$ and $TB_y$, as long as $TB_x=16\delta_x$ and $TB_y=16\delta_y$, where $\delta_x$ and $\delta_y$ are positive integers $\in[1, \delta_{max}]$. In other words, $TB_x$ and $TB_y$ are no longer required to have the same value, as long as they are both multiples of 16, up to some maximum value such as 256. $\delta_x$ and $\delta_y$ are referred to as row-stops and column-stops, respectively. The reason for having $\delta_x$ and $\delta_y$ as adjustable GEMM parameters is that their product $\delta_x\delta_y$ determines the number of C elements computed by a single thread, which needs to keep track of $\delta_x\delta_y$ running sums, one for each element of C assigned to the thread.

For maximum performance, it is best to store these running sums in on-chip registers. However, the maximum number of registers in a Fermi GPU for a single thread is only 63, which constrains the practical values of $\delta_x$ and $\delta_y$. For example, if $\delta_x\delta_y>63$, there will not be enough registers for a Fermi GPU to hold all the elements of C assigned to a thread, causing some of the running sums to be stored in private local memory, which is significantly slower than L1 cache or shared memory. This is called register spilling, which should be carefully avoided in most cases. As shown in FIG. 2, the variable-dimension kernels are flexible in their row-wise and column-wise dimensions measured by $TB_x$ and $TB_y$, making it possible to compute as few as one or as many as $(\delta_{max})^2$ elements of C in a single thread. The latest Kepler GPU allows a single thread to use up to 255 registers, which roughly equals $(\delta_{max})^2$ for $\delta_{max}=16$, which is the value used in the experiments. Note that MAGMA's GEMM implementation can be seen as a special case of the variable-dimension GEMM kernels with $\delta_x=\delta_y=6$. To allow better code optimization, one can declare $\delta_x$ and $\delta_y$ as constants that are determined at compile time. Thus, instead of having one kernel that handles all possible row- and column-stops $\delta_x$, $\delta_y$ $\in[1, \delta_{max}]$, one can have a $\delta_{max}\times\delta_{max}$ array of kernels such that each implements a specific combination of $\delta_x$ and $\delta_y$.

While the introduction of constant-K and variable-dimension GEMM kernels lets one explore more thoroughly the design space of GEMM techniques, it also brings along two challenges:

1. How to determine which kernel is the best for which values of M, N, and K?

2. How to find the best kernel for a specific combination of M, N, and K?

To address the first challenge, a GEMM system may use a testing technique to measure the speed of various kernels to identify the best (e.g., fastest) kernel for each of M, N, and K combinations tested. Due to the importance of tall-and-skinny matrices in data analytics applications, the current disclosure focuses on the cases where $M\gg N\approx K\in[2, 96]$. From a data mining or machine learning perspective, M, N, and K can be interpreted as follows:

M: the number of input vectors in the training or test set,

N: the number of learned vectors, and

K: the number of features in each input vector

The concept of learned vectors is quite general and can be found in many learning techniques. For example, in k-means clustering, the cluster centroids are such learned vectors and thus N is equal to the number of clusters. As another example, in support vector machines, the support vectors are such learned vectors and thus N is equal to the number of support vectors. Usually, $M\gg N$ and $M\gg K$, which makes tall-and-skinny matrices more suitable than regularly-shaped (e.g., square) matrices for machine learning. In the experiments, M is set to $10^6$ to make sure matrix A is sufficiently "tall" and $K\leq 96$ to make sure it is "skinny." In addition, N is set to be in a range (e.g., [16, 96]) such that M×N, the size of matrix C, remains reasonable.

Pseudocode of Smart GEMM Testing Technique

FIG. 3 presents the pseudocode 300 of a Smart GEMM testing technique, in accordance with an embodiment of the present invention. The Smart GEMM testing technique tests the GEMM kernels on various combinations of M, N, and K and stores the best kernel for handling each combination as rules that the testing technique outputs in the end. Unlike MAGAMA, the GEMM kernels of this disclosure can handle large values of M such that $[M/TB_x]$ exceeds the number of thread blocks that can be encoded in the $1^{st}$ dimension of the thread grid limited by the hardware.

For example, Fermi GPUs can only have a maximum of 65,535 thread blocks in the $1^{st}$ dimension of the thread grid, which means the maximum M allowed in MAGMA is 65,535*96=6,291,360. If there are no more than 81 columns, a 32-bit floating point matrix of 6.3 million rows can fit in a single GPU with 2 GB of global memory. Thus, MAG- MA's limitation of M<6.3 million can be an issue for tall-and-skinny matrices. On the other hand, the GEMM kernels of this disclosure use both the $1^{st}$ and $2^{nd}$ dimensions of the thread grid to encode $\lceil M/TB_x \rceil$, and thus M can be as large as $65{,}535*65{,}535*16*\delta_x=6.87E10\delta_x \geq 6.87E10$, since $\delta_x \geq 1$.

Note that the technique shown in FIG. 3 is not limited to tall-and-skinny matrices, since it can include ⟨M, N, K⟩ test triples even for M=N=K (i.e., square matrices). Thus, the rules generated can be used to select the best GEMM kernel for processing regularly-shaped as well as tall-and-skinny matrices. However, if it is used in applications that primarily involve tall-and-skinny matrices, then the testing technique can be simplified to use a large, constant M (e.g., $M=10^6$) in all of the test triples, because one only needs to know the relative speed of different kernels in order to pick the fastest one, which is typically insensitive to the value of M if it is already large. For example, the fastest GEMM kernel for a matrix with one million rows may still be the fastest for another matrix with 10× more rows (i.e., $M=10^7$), if N and K remain the same. On the other hand, even if M is the same, the fastest kernel can still vary significantly for different values of N and K, which are typically small for tall-and-skinny matrices. Thus, a better strategy of Smart GEMM testing customized for tall-and-skinny matrices is to use a single large fixed M with many different combinations of N and K to more efficiently map out the 3-dimensional M-N-K parameter space of GEMM. As the experiments show, the performance of GEMM kernels, under the same M but different ⟨N, K⟩ combinations, varies substantially.

For the same GPU hardware, testing only needs to be performed once for each ⟨M, N, K⟩ test triple, and one can use multiple homogeneous GPUs to speed up the testing process. To share the results of testing across different GPUs, one can use a declarative rule-based system to store, query, and fire the kernel selection rules. A declarative kernel selection rule in this disclosure takes the form of "parameters→kernel" in which "parameters" is a set of parameters for a problem instance that can affect the selection of the kernel, and "kernel" identifies the best kernel for the problem instance described by parameters. For GEMM, one can use {M, N, K} as the parameters, or simply {N, K}, if M is large enough that the performance of a kernel is more or less independent of. For the "kernel" part (i.e., the right-hand side) of a rule, there are a number of ways to identify the best kernel such as:

Numeric identifier of the GEMM kernel
Symbolic name of the GEMM kernel
List of kernel features that can uniquely identify the GEMM kernel The first option requires each kernel to have a unique numeric identifier, which may be harder to keep track of and thus more difficult to maintain over time. The last two options are easier to understand and less error-prone. For example, according to Table 2 the fastest kernel for $M=10^6$, N=16, K=2 is the variable-dimension constant-K kernel with $\delta_x=8$ and $\delta_y=1$, which can be uniquely described as the "type=ConstK, $\delta_x=8$, $\delta_y=1$" kernel. For simplicity, a GEMM kernel can be written as a ⟨type, $\delta_x$, $\delta_y$⟩ tuple, where type ∈ {ConstK, VarK} and $\delta_x, \delta_y \in [1, \delta_{max}]$ are the features of the kernel. For example, the $1^{st}$ row of Table 2 can be expressed in the form of "M, N, K→type, $\delta_x$, $\delta_y$" as follows:

$10^6$, 16, 2→ConstK, 8, 1
$10^6$, 32, 2→ConstK, 4, 2
$10^6$, 48, 2→ConstK, 4, 3
$10^6$, 64, 2→ConstK, 4, 4
$10^6$, 80, 2→ConstK, 4, 5
$10^6$, 96, 2→ConstK, 4, 6

For tall-and-skinny matrices, one may omit M in the left side of the rule, since it rarely affects the selection of the best GEMM kernel. Furthermore, $\delta_y$ in the right side of the rule may be omitted as well, because the optimal $\delta_y$ is typically determined by N, which is already mentioned in the rule. Let $\delta^*_y$ be the optimal $\delta_y$, it can be shown that $\delta^*_y \leq \lceil N/16 \rceil$, because $TB_y = 16\delta_y \leq N$. If N is much smaller than M, using a larger $\delta_y$ can reduce the number of thread blocks needed by GEMM, since the total number of thread blocks is $\lceil M/TB_x \rceil \times \lceil N/TB_y \rceil = \lceil M/(16\delta_x) \rceil \times \lceil N/(16\delta_y) \rceil$, subject to the constraint that the shared memory used by a thread block, which is $O((TB_x+TB_y) \times b) = O((16\delta_x + 16\delta_y) \times 16) = O(\delta_x + \delta_y)$, must be less than the total shared memory available on a SM, which is 48 KB (a constant). If M and N were both large, then setting $\delta_x = \delta_y$ tends to minimize the number of thread blocks, but if N is small (e.g., N≤96), then maximizing $\delta_y$ tends to minimize the number of thread blocks needed by GEMM. Thus, for tall-and-skinny matrices, setting $\delta_y = \lceil N/16 \rceil$ is a good heuristic for GEMM. As a result, the previous example rules for the $1^{st}$ row of Table 2 can be simplified to:

16, 2→ConstK, 8
32, 2→ConstK, 4
48, 2→ConstK, 4
64, 2→ConstK, 4
80, 2→ConstK, 4
96, 2→ConstK, 4

If a particular GEMM instance has an ⟨N, K⟩ combination not previously tested, the technique can either perform the test on the fly, run the fastest kernel found, and add the newly discovered rule to the rule database, or find a rule that is the most similar, and pick the kernel prescribed by the most-similar rule To determine how similar two rules are to one another, one can use a non-negative parameter distance function d, such that d(p, p)=0 and $d(p_1, p_2) > 0$, if parameters $p_1 \neq p_2$. To further distinguish the type of GEMM kernels, the parameter distance function d takes as additional input t, the type of the kernel. Let $p_1 = \langle N_1, K_1 \rangle$ and $p_2 = \langle N_2, K_2 \rangle$. Function $d(p_1, p_2, t)$ can be implemented as follows:

if t=constK and $K_1 \neq K_2$ then return ∞ /* constant-K kernels must agree on K */
$d_N \leftarrow 16 \| \lceil N_1/16 \rceil - \lceil N_2/16 \rceil \|$ /* convert N to $\delta_y$ before computing the distance */
$d_K \leftarrow \| K_1 - K_2 \|$ /* $d_K$: the distance in terms of K */
return $(w_N \times d_N + w_x \times d_K)$ /* $w_N$, $w_x$: positive coefficients to combine $d_N$ and $d_K$ */

A GEMM system can use either L1 or L2 norm to compute the distance. The system can use two non-negative coefficients $w_N$, $w_K$ to combine $d_N$ (the distance in terms of N) and $d_K$ (the distance in terms of K) into a scalar. Picking the best weights $w_N$ and $w_K$ may depend on the performance of different GEMM kernels and the distribution of ⟨N, K⟩ that each kernel is best at.

Since the performance difference tends to decrease as N and K increase, it usually suffices to pick the variable-K kernel prescribed for the largest ⟨N, K⟩ (e.g., the maximum product of N and K) available in the rule database. This creates a simple fallback rule that can be used whenever the solver is presented with a novel ⟨N, K⟩ combination untested before.

Exemplary Process to Perform GEMM Operation

Figure 4:
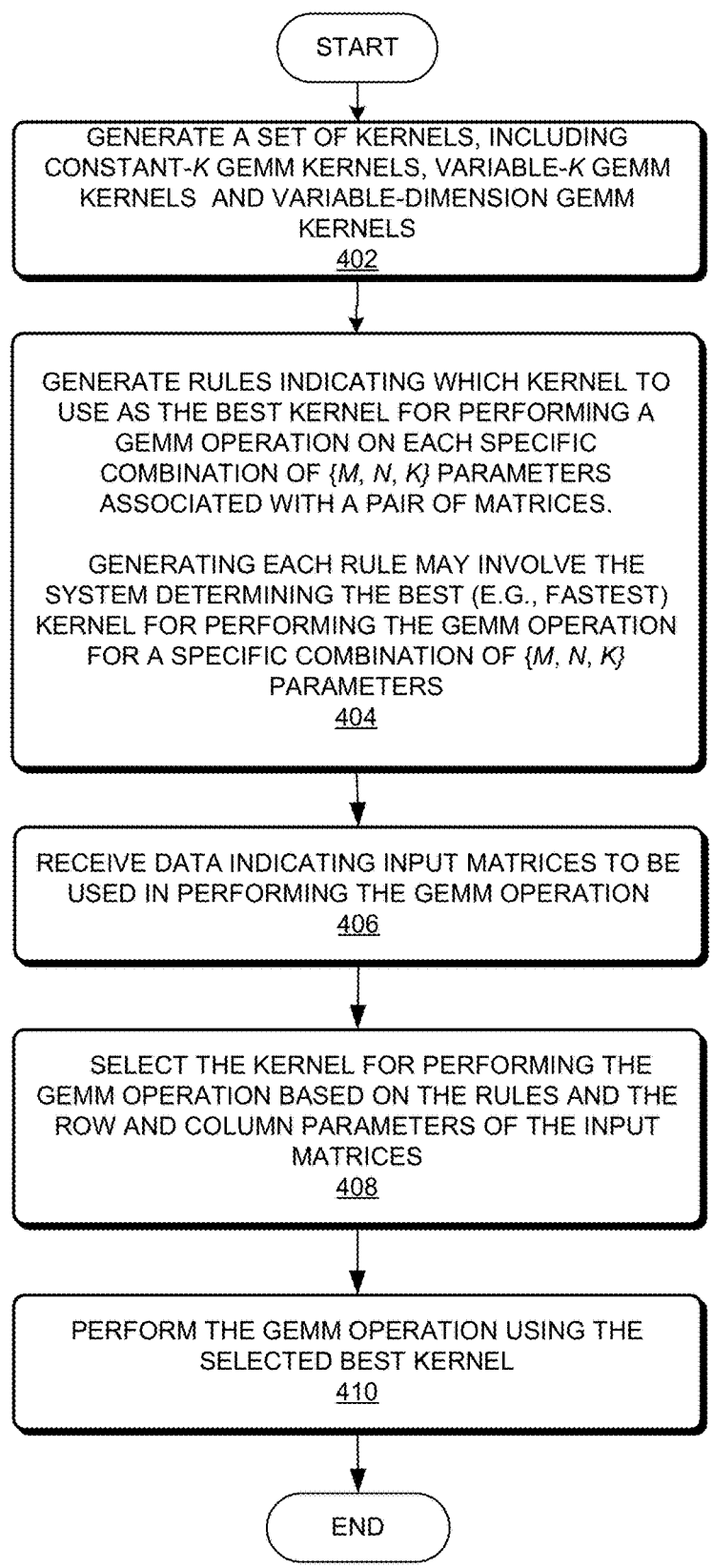
FIG. 4 presents a flow chart illustrating an overview of an exemplary process for performing a GEMM operation, in accordance with an embodiment of the present invention.

FIG. 4 presents a flow chart illustrating an overview of an exemplary process for performing a GEMM operation, in accordance with an embodiment of the present invention. As depicted in FIG. 4, the system may initially generate a set of kernels, including constant-K GEMM kernels, variable-K GEMM kernels, and variable-dimension GEMM kernels (operation 402). The system may generate variable-dimension constant-K GEMM kernels, and can also generate variable-dimension variable-K GEMM kernels.

The system may generate rules indicating which kernel to use as the best kernel for performing a GEMM operation on each specific combination of {M, N, K} parameters associated with a pair of matrices (operation 404). Generating each rule may involve the system determining the best (e.g., fastest) kernel for performing the GEMM operation for a specific combination of {M, N, K} parameters. In some embodiments, the system may generate a rule and add the rule to a rules set each time the system determines the best kernel for a particular combination of {M, N, K} parameters. In this manner, the system may determine the Pareto frontier of the set of kernels. Each kernel in the Pareto frontier is the best (e.g., fastest) at performing at least one GEMM operation involving a {M, N, K} parameter combination.

The system may subsequently receive data indicating input matrices to be used in performing the GEMM operation (operation 406). The system may select the kernel for performing the GEMM operation based on the rules and the row and column parameters of the input matrices (operation 408). The system may access a rules collection stored in a database to determine a mapping from the dimensions of the input matrices to a specific kernel. The kernel that the system selects according to rules is the fastest kernel for the particular dimensions of the input matrices. The system may then perform the GEMM operation using the selected best kernel (operation 410).

Performance Test Results

The inventor has thoroughly tested the techniques presented in this disclosure with a wide range of matrix shapes and sizes (with 570 different matrix height and width combinations). The code is quite stable with a simple API. Most of the kernels are implemented with C++ templates, which significantly improve the readability and maintainability of the code. It outperforms the state-of-the-art GEMM implementation (e.g., MAGMA) by 200% on average for various tall-and-skinny matrices, and saves up to 16× the memory needed by MAGMA.

The Smart GEMM testing technique and the selected kernels were run on Nvidia's GeForce GTX 580 GPU. All test matrices are in row-major order without any storage padding. In row-major order, consecutive elements of the rows are stored contiguously in memory.

FIG. 5A-5B presents Table 1 which shows the performance of the best GEMM kernels of each type, including (a) the fixed-dimension kernel with $\delta_x=\delta_y=6$, which is essentially MAGMA's GEMM technique; (b) variable-dimension constant-K kernels with $\delta_x \in [4, 16]$ and $\delta_y \in [1, 6]$; and (c) variable-dimension variable-K kernels with $\delta_x \in [4, 16]$ and $\delta_y \in [1, 6]$. The performance of a kernel is measured in GFLOPS ($10^9$ floating-point operations per second), and the parameters used are $M=10^6$, $N \in \{16, 32, 48, 64, 80, 96\}$, and $K \in [2, 48]$. The GFLOPS number of the fastest kernel type for every ⟨N, K⟩ combination tested is shown in bold font.

As shown in Table 1, constant-K kernels are the fastest for $K \in [2, 6]$. Then variable-K kernels start to outperform constant-K kernels for some values of N (e.g., 80 and 96) and $K \in [6, 25]$. If $K \geq 26$, variable-K kernels are the fastest, for all values of N tested. The horizontal line in Table 1 separates the K's for which constant-K kernels are the fastest for at least one $N \in \{16, 32, 48, 64, 80, 96\}$, from those K's for which variable-K kernels are the fastest for all the N's tested.

FIG. 6A-6B presents Table 2 which shows the optimal GEMM kernel type and $\delta_x$ for $M=10^6$, $N \in \{16, 32, 48, 64, 80, 96\}$ ($\delta_y = \lceil N/16 \rceil$), and $K \in [2, 48]$. It can be observed that the optimal kernel type and $\delta_x$ vary from one ⟨N, K⟩ combination to another. Of the 13 distinct values of $\delta_x \in [4, 16]$ tested, only three {12, 15, 16} were found to be always sub-optimal, regardless of the values of N and K. The remaining 10 are all useful, because each optimizes at least one ⟨N, K⟩ combination.

Figure 7:
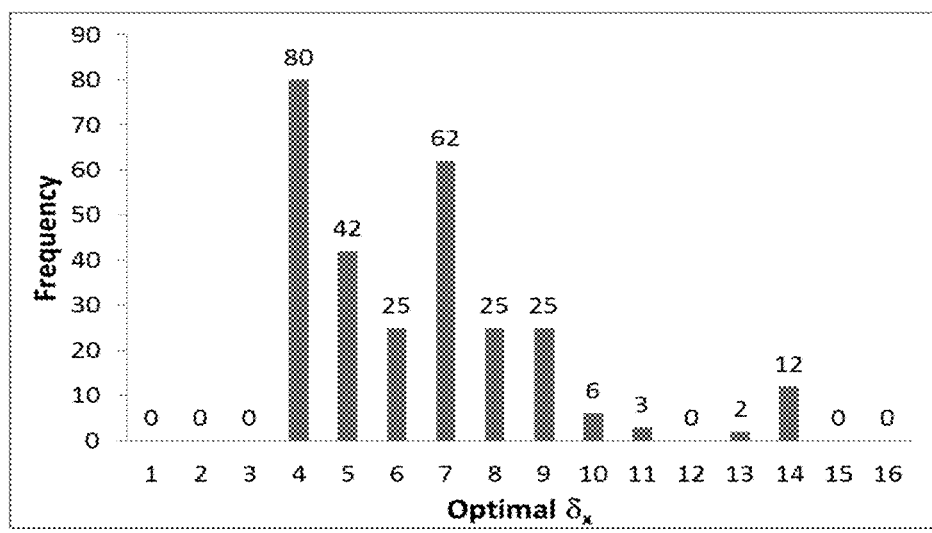
FIG. 7 shows a histogram of optimal $\delta_x$ based on the data from Table 2.

FIG. 7 shows a histogram 700 of optimal $\delta_x$ based on the data from Table 2. It is clear that a single fixed $\delta_x$ cannot achieve the best GEMM performance for all ⟨N, K⟩ combinations tested. The value of $\delta_x$ that occurs with the highest frequency is 4 (as opposed to 6 used in MAGMA), which only accounts for 80/282=28% of the cases in Table 2. This underscores the importance of using variable-dimension GEMM kernels, regardless of whether they are constant-K or variable-K.

FIG. 8A-8B presents Table 3 which shows the ratio of the maximum and the minimum GEMM speed achieved by variable-dimension kernels using $\delta_x \in [4, 16]$ for $M=10^6$, $N \in \{16, 32, 48, 64, 80, 96\}$, and $K \in [2, 48]$. Note that the clearly sub-optimal $\delta_x \in [1, 3]$ are not included in the comparison, to ensure even the slowest GEMM kernel is reasonably fast. This shows the performance improvement that can be realized by carefully picking the best $\delta_x$ for different values of N and K, for either type of kernels.

FIG. 9A-9B presents Table 4 which shows the speedup of Smart GEMM kernels against the best fixed-dimension kernel for $M=10^6$, $N \in \{16, 32, 48, 64, 80, 96\}$, and $K \in [2, 48]$. The largest speedups are achieved by small values of N and K, suggesting the more skinny the matrix is, the greater the speedup would be. The best fixed-dimension kernel is based on MAGMA's GEMM implementation that has been optimized for Fermi GPUs. Thus, its speed is very comparable, if not identical, to that of MAGMA's.

Average Speedup of Smart GEMM Kernels

Figure 10:
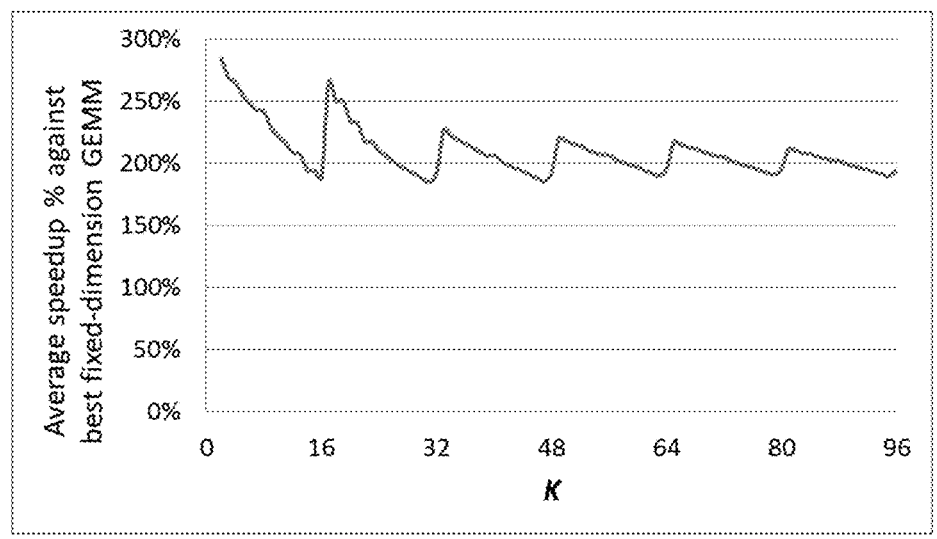
FIG. 10 presents a chart showing the average speedup of Smart GEMM kernels against the best fixed-dimension kernel.

FIG. 10 presents a chart 1000 showing the average speedup of Smart GEMM kernels against the best fixed-dimension kernel for a wider range of $K \in [2, 96]$ (as opposed to $K \in [2, 48]$ previously reported). The speedup is averaged across all values of $N \in \{16, 32, 48, 64, 80, 96\}$. The speedup curve in FIG. 10 shows a pattern with a periodicity of 16, although the performance fluctuation tends to diminish as K increases. This is likely caused by memory alignment, since all test matrices are in row-major order and do not have storage paddings. Because a fixed-dimension kernel can only use a single $\delta_x$ for different values of N and K, it is more susceptible to memory alignment issues than variable-dimension kernels, which can adjust $\delta_x$ (and potentially $\delta_y$ too) to mitigate such issues. As a result, the speedup of Smart GEMM is greater for $K \in \{17, 33, 49, 65, 81\}$, which has poor memory alignment compared to other values of K that are multiples of 16. If the system were to enforce 128-byte memory alignment by using storage paddings (as does MAGMA), then the memory requirements for the same matrices would increase to {188%, 194%, 131%, 148%, 119%} of the original size for $K \in \{17, 33, 49, 65, 81\}$, respectively.

Figure 11:
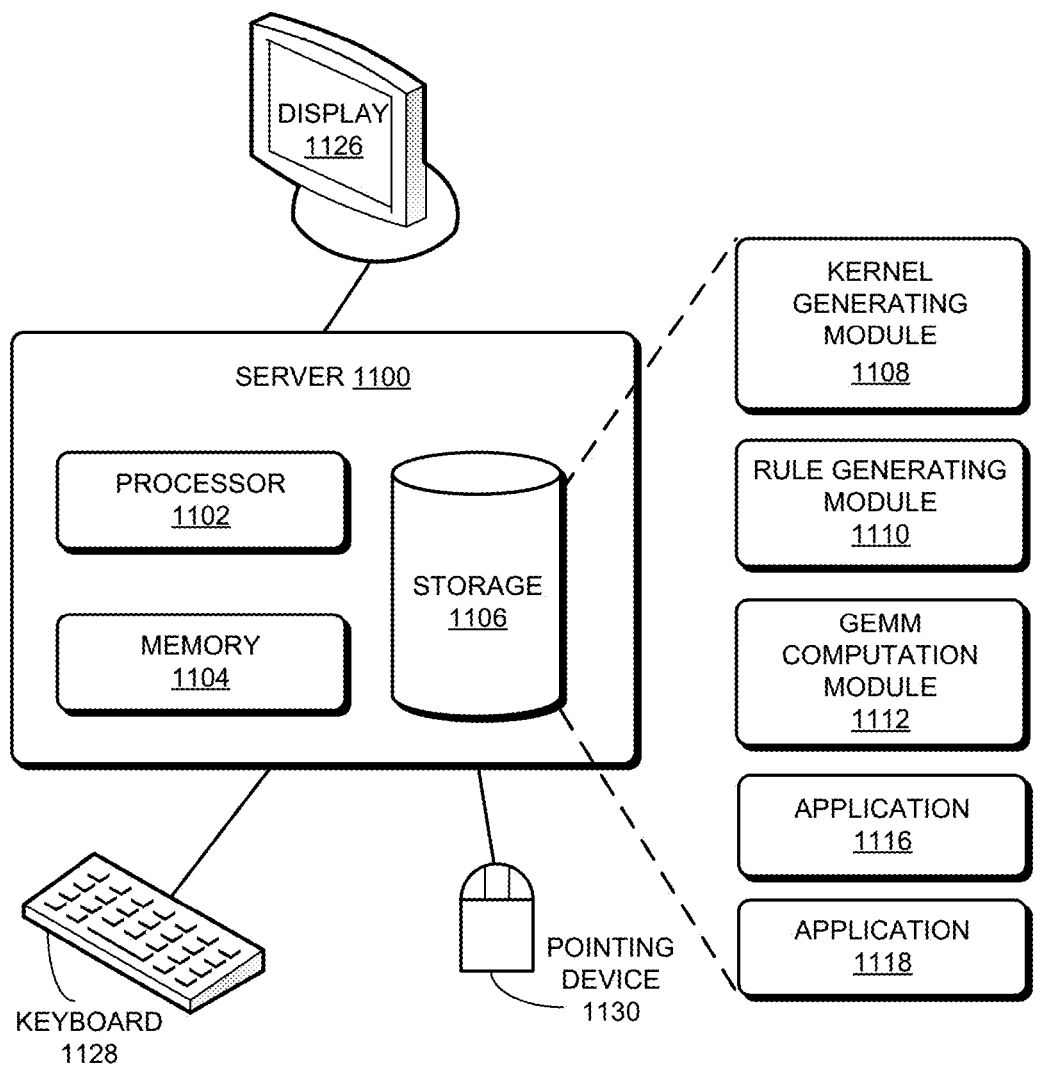
FIG. 11 presents an exemplary GEMM server, in accordance with an embodiment of the present invention.

FIG. 11 presents an exemplary GEMM server 1100, in accordance with an embodiment of the present invention. In FIG. 11, server 1100 includes a processor 1102, a memory 1104, and a storage device 1106. Storage device 1106 stores programs to be executed by processor 1102. Specifically, storage device 1106 stores a kernel generating module 1108, a rule generating module 1110, and a GEMM computation module 1112, as well as other applications, such as applications 1116 and 1118.

Kernel generating module 1108 may generate kernels, including variable-dimension GEMM kernels such as constant-K GEMM kernel, variable-K GEMM kernels, or any combination thereof. Rule generating module 1110 may test kernels to determine the best kernels for particular row and column parameter combinations and generate rules to select the best kernels for performing GEMM operations. GEMM computation module 1112 may select the best kernel according to the rules and the dimensions of the matrices and perform GEMM operations on input matrices. During operation, kernel generating module 1108, rule generating module 1110, and GEMM computation module 1112 are loaded from storage device 1106 into memory 1104 and then executed by processor 1102. While executing the program, processor 1102 performs the aforementioned functions. Server 1100 may be coupled to an optional display 1126, a keyboard 1128, and a pointing device 1130.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-executable method for performing a general matrix-matrix multiplication (GEMM) operation on a graphics processing unit (GPU), comprising:
generating, by computer, a plurality of kernels, wherein a respective kernel of the plurality of kernels is a function compiled for execution on the GPU;
maintaining a plurality of rules, wherein a respective rule of the plurality of rules includes a mapping between dimensional parameters, which includes a number of rows and columns of a respective first matrix and a number of columns of a respective second matrix, and a corresponding kernel, wherein the mapping indicates that the corresponding kernel can perform the GEMM operation faster than any other kernel in the plurality of kernels for the dimensional parameters in the mapping;
storing data associated with two matrices in a memory of the computer based on at least a row-major order or a column-major order with at least one row or column having no adjacent storage padding, wherein an adjacent storage padding is a set of bits for aligning a start address of the row or column, thereby reducing memory usage on the computer;
determining a first set of dimensional parameters of the two matrices;
loading a kernel from the plurality of kernels on the GPU for performing the GEMM operation on the GPU by looking up the first set of dimensional parameters in the plurality of rules; and
executing the loaded kernel on the GPU using the two matrices stored in the memory as parameters, thereby performing the GEMM operation on the two matrices.

2. The method of claim 1, wherein the plurality of kernels includes a variable-K GEMM kernel, and wherein the method further comprises:
generating the variable-K GEMM kernel to perform GEMM operations in which a number of rows $TB_x$ of a matrix A that are processed by a thread block and a number of columns $TB_y$ of a matrix B that are processed by the thread block are not always the same value, $TB_x$ is equal to a multiple of a row-stop value, and $TB_y$ is equal to a multiple of a column-stop value.

3. The method of claim 1, wherein the plurality of kernels includes a constant-K GEMM kernel, and wherein the method further comprises:
generating the constant-K GEMM kernel to perform GEMM operations in which a number of rows $TB_x$ of a matrix A that are processed by a thread block and a number of columns $TB_y$ of a matrix B that are processed by the thread block are not always the same value, $TB_x$ is equal to a multiple of a row-stop value, and $TB_y$ is equal to a multiple of a column-stop value.

4. The method of claim 1, further comprising generating the plurality of rules, which involves:
determining, for a respective kernel of the set of kernels, computation times for performing GEMM operations for a specific set of dimensional parameters;
identifying a specific kernel for which the computation time is faster than any other kernel for the specific set of dimensional parameters; and
adding, to the plurality of rules, a rule comprising a mapping between the specific set of dimensional parameters and the specific kernel.

5. The method of claim 4, further comprising:
using a constant parameter combined with other variable parameters to reduce a number of tests required.

6. The method of claim 4, further comprising:
performing non-uniform sampling density along M, N, and K axes of a three-dimensional testing space to obtain a set of <M, N, K> test triples, wherein M, N, and K are associated with the specific set of dimensional parameters.

7. The method of claim 1, further comprising storing the set of rules in a rule database that is accessible from multiple GPUs thereby allowing a respective GPU to select a kernel based on a given set of dimensional parameters without redundant tests.

8. The method of claim 1, further comprising:
in response to determining that a lookup for the first set of dimensional parameters in the plurality of rules has failed, performing a lookup in the plurality of rules for finding a rule associated with a second set of dimensional parameters within one or more predetermined thresholds of the first set of dimensional parameters.

9. The method of claim 8, further comprising using a non-negative parameter distance function to determine a proximity of rules to select the kernel from the set of kernels for loading on the GPU.

10. The method of claim 1, wherein loading the kernel further comprises:
selecting the kernel in a rules database based on respective numbers of columns of the two matrices.

11. The method of claim 1, further comprising:
performing a testing operation to determine that the kernel is faster than other kernels for performing the GEMM operation on the two matrices; and
including a rule that maps the first set of dimensional parameters to the kernel in the set of rules.

12. The method of claim 1, further comprising:
using multiple dimensions of a thread grid of the GPU to encode a coordinate of a thread block, thereby increasing a number of rows or columns of matrices used in the GEMM operation.

13. The method of claim 1, wherein the GEMM operation is performed as part of of a machine learning operation or a data mining operation using the GPU.

14. The method of claim 1, wherein, among the plurality of kernels, the selected kernel performs the GEMM operation for the first set of dimensional parameters of the two matrices in a least amount of time.

15. The method of claim 1, further comprising storing running sums associated with a respective thread of the GEMM operation in on-chip registers of the GPU.

16. A non-transitory computer-readable storage medium storing instructions which when executed by a computer cause the computer to perform a method for general matrix-matrix multiplication (GEMM) operation on a graphics processing unit (GPU), the method comprising:
generating a plurality of kernels, wherein a respective kernel of the plurality of kernels is a function compiled for execution on the GPU;
maintaining a plurality of rules, wherein a respective rule of the plurality of rules includes a mapping between dimensional parameters, which includes a number of rows and columns of a respective first matrix and a number of columns of a respective second matrix, and a corresponding kernel, wherein the mapping indicates that the corresponding kernel can perform the GEMM operation faster than any other kernel in the plurality of kernels for the dimensional parameters in the mapping;
storing data associated with two matrices in a memory of the computer based on at least a row-major order or a column-major order with at least one row or column having no adjacent storage padding, wherein an adjacent storage padding is a set of bits for aligning a start address of the row or column, thereby reducing memory usage on the computer;
determining a first set of dimensional parameters of the two matrices;
loading a kernel from the plurality of kernels on the GPU for performing the GEMM operation on the GPU by looking up the first set of dimensional parameters in the plurality of rules; and
executing the loaded kernel on the GPU using the two matrices stored in the memory as parameters, thereby performing the GEMM operation on the two matrices.

17. The storage medium of claim 16, wherein the plurality of kernels includes a constant-K GEMM kernel, and wherein the method further comprises:
generating the constant-K GEMM kernel to perform GEMM operations in which a number of rows $TB_x$ of a matrix A that are processed by a thread block and a number of columns $TB_y$ of a matrix B that are processed by the thread block are not always the same value, $TB_x$ is equal to a multiple of a row-stop value, and $TB_y$ is equal to a multiple of a column-stop value.

18. The storage medium of claim 16, wherein the method further comprises generating the plurality of rules, which involves:
determining, for a respective kernel of the set of kernels, computation times for performing GEMM operations for a specific set of dimensional parameters;
identifying a specific kernel for which the computation time is faster than any other kernel for the specific set of dimensional parameters; and
adding, to the plurality of rules, a rule comprising a mapping between the specific set of dimensional parameters and the specific kernel.

19. A computing system comprising:
a graphics processing unit (GPU);
one or more processors;
a memory; and
a non-transitory computer-readable medium coupled to the one or more processors storing instructions stored that, when executed by the one or more processors, cause the computing system to perform a method for performing a general matrix-matrix multiplication (GEMM) operation on the GPU, the method comprising:
generating a plurality of kernels, wherein a respective kernel of the plurality of kernels is a function compiled for execution on the GPU;
maintaining a plurality of rules, wherein a respective rule of the plurality of rules includes a mapping between dimensional parameters, which includes a number of rows and columns of a respective first matrix and a number of columns of a respective second matrix, and a corresponding kernel, wherein the mapping indicates that the corresponding kernel can perform the GEMM operation faster than any other kernel in the plurality of kernels for the dimensional parameters in the mapping;
storing data associated with two matrices in the memory of the computer based on at least a row-major order and or a column-major order with at least one row or column having no adjacent storage padding, wherein an adjacent storage padding is a set of bits for aligning a start address of the row or column, thereby reducing memory usage on the computer;
determining a first set of dimensional parameters of the two matrices;
loading a kernel from the plurality of kernels on the GPU for performing the GEMM operation on the GPU by looking up the first set of dimensional parameters in the plurality of rules; and
executing the loaded kernel on the GPU using the two matrices stored in the memory as parameters, thereby performing the GEMM operation on the two matrices.

20. The computing system of claim 19, wherein the plurality of kernels includes a variable-K GEMM kernel, and wherein the method further comprises:
generating the variable-K GEMM kernel to perform GEMM operations in which the number of rows $TB_x$ of a matrix A that are processed by a thread block and the number of columns $TB_y$ of a matrix B that are processed by the thread block are not always the same value, $TB_x$ is equal to a multiple of a row-stop value, and $TB_y$ is equal to a multiple of a column-stop value.

* * * * *